United States Patent Office 3,579,451
Patented May 18, 1971

3,579,451
ELECTROPHOTOGRAPHIC DEVELOPER MADE FROM CROSS-LINKED SILICONE INTERMEDIATE RESIN
Louis J. Sciambi, Wenonah, N.J., assignor to The Dow Chemical Company, Midland, Mich.
No Drawing. Continuation-in-part of application Ser. No. 582,541, Sept. 28, 1966. This application Jan. 22, 1969, Ser. No. 793,152
Int. Cl. G03g 9/02, 9/04
U.S. Cl. 252—62.1          3 Claims

ABSTRACT OF THE DISCLOSURE

The method of preparing a stable, dry electrophotographic developer composition concentrate consists essentially of admixing and suspending about one part by weight of a silicone intermediate resin with from about one to five parts by weight of a cross-linking promoting catalyst in an aromatic carrier liquid and heating the admixture at a temperature of from about 50 to 100° C. for a period of about 1 to 24 hours; admixing the heated admixture with from about 0.5 to 4 parts by weight of an insoluble solid pigment per part of resin plus catalyst present (solvent-free basis); milling the resin-catalyst and pigment mixture together in a grinding mill for at least about 8 hours; and evaporating the solvent from the so-milled admixture.

The dry concentrate is made into a liquid concentrate by milling the dry solids for from about 8 to 24 hours with sufficient organic carrier liquid, such as a liquid aliphatic hydrocarbon, to provide a suitable grinding slurry viscosity. This milled liquid concentrate is diluted further with carrier liquid to provide the proper concentration of catalyst per liter of composition as well as an electrical conductivity within the desired range and the so-diluted mixture is a working electrophotographic developer composition.

CROSS-REFERENCE TO OTHER APPLICATIONS

This application is a continuation-in-part of copending application Ser. No. 582,541, filed Sept. 28, 1966, now abandoned.

BACKGROUND OF THE INVENTION

(1) Field of the invention

This invention relates to electrophotography and more particularly concerns a method of preparing a stable, dry concentrate of an electrically conductive liquid developer composition and subsequently reconstituting the same for use in preparing printing plates and masters.

(2) The prior art

One method of electrophotographically preparing printing plates comprises, for example, first establishing a thin photoconductive coating on an etchable plate of photoengraving grade magnesium or zinc base metal. The photoconductive composition may comprise, for instance, a mixture of a photoconductive zinc oxide suspended as a fine dispersion of particles in a cross-linking, film forming, resinous insulating binder. Suitable resinous binders include, for example, polyvinylbutyral resins, silicone intermediate resins and epoxy resins having epoxide equivalent weights of about 475 to 2000. The plate so-coated is then negatively electrostatically charged by corona discharge means and exposed to an illuminated image desired to be reproduced, either by contact or projection techniques, thereby to form a latent electrostatic image or pattern on the plate. The images to be reproduced commonly include design work, lines, letters, and photographs. In the case of photographs, the image must first be "screened" in order to break up the image into so-called halftone dots before the charged plate is exposed thereto.

The latent image is subjected to the action of a number of subsequent steps to "develop" it to convert it to a visible fixed image which is, e.g., resistant to an acid etching composition (called a "resist"), or to convert it to an image suitable, e.g., for use in lithographic printing masters. These subsequent steps may comprise, for example, contacting the electrostatic image with cross-linking promoting catalyst particles of aluminum octanoate in an inert hydrocarbon carrier liquid. So-contacted, the plate is rinsed as free of catalyst particles as possible in an inert rinse liquid, dried, then exposed to an elevated temperature, such as 175 to 300° C., but more preferably about 250 to 275° C., to promote cross-linking (or curing) of the resin binder to form the aforesaid photo resist in the image areas. The non-image areas, not having been deposited by catalyst, are then removed with a suitable solvent and scrubbing. Any chromate conversion coatings in these non-image areas are removed such as by an acid wash. The plate now exhibiting a visible image is ready for etching, preferably by the powderless etching process disclosed and claimed in U.S. Letters Patent 2,828,194 or 3,152,083. The plate may also be powder-etched.

Developer compositions heretofore disclosed and prepared were electrically insulating in purpose and selected for their deliberately low electrical conductivity. The carrier liquids in these conventional compositions are of high electrical resistivity as disclosed, e.g., in Reproduction Methods, October 1964, page 44 wherein it is stated that "The liquid phase is invariably an organic compound of high electrical resistivity . . . a minimum of about $10^9$ ohm-cms. in value."

OBJECTS OF THE INVENTION

An object of the present invention is to provide a novel method of preparing a developer composition for use in electrophotographically preparing fixed images on a substrate.

Another object of the invention is to provide a method of preparing an effective and improved electroconductive liquid developer composition for use in developnig electrophotographic plates.

Another object is to provide a method of preparing a time stable, electrically conductive, liquid developer for use in developing latent electrostatic images.

A further object of the invention is to provide a method of preparing a time stable conductive liquid developer for use in processing electrophotographic plates to produce etchant resist image patterns thereon.

A still further object of the invention is to provide a method of preparing a stable developer composition which is characterized as having an electrical conductivity in solution, of from about $0.5 \times 10^{-11}$ to about $10^{-9}$ reciprocal ohm centimeters, a high flash point and low toxicity, a high capacity, and which will not congeal upon standing for extended periods, the images developed being of high quality.

SUMMARY OF THE INVENTION

In general, the present invention comprises a method of preparing an electrically conductive developer composition consisting essentially of the following sequence of process steps: (1) heating a mixture of a silicone intermediate resin and a cross-linking promoting catalyst suspended in an organic aromatic liquid at a temperature of from about 50° C. to about 100° C. for a period of from about 1 to about 24 hours, the weight ratio of catalyst-to-resin being within the range of from about 1 to about 5 parts catalyst per part resin, (2) admixing with the resin-catalyst mixture from about 0.5 to about 4 parts by weight of an insoluble solid pigment per part of the resin-catalyst solids in said mixture, (3) milling the resin-catalyst mixture and pigment together in a suitable mill for from about 8 to about 24 hours or more to reduce the material to submicron sized particles at a viscosity in the mill to promote maximum tumbling and grinding, (4) evaporating the materials so-milled to dryness either by heating or air drying with or without vacuum, whereupon the dry material may be granulated and stored as a dry concentrate or used immediately by diluting with a sufficient quantity of an organic carrier liquid and milling for from 8 to 24 hours to produce a concentrate, or, upon being milled and further diluted with carrier liquid, to produce a working developer bath of the desired catalyst concentration and electrical conductivity.

In a preferred embodiment of the invention, the silicone resin is dissolved in the aromatic liquid as up to a 50 percent solution thereof, preferably a 2 percent solution, whereupon, the catalyst is added in a preferred ratio of 2 to 3 parts catalyst per part of resin, and the resin-catalyst mixture heated at about 60° to about 80° C. for from about 4 to about 12 hours. The pigment, preferably cyan peacock blue, is added to this resin-catalyst mixture, based on the weight of solids therein, in a ratio of from 1 to 2 grams pigment per gram of said mixture and the resin-catalyst-pigment components are milled together for from about 12–16 hours at, e.g., room temperature. The milled mixture is then dried by some convenient method, and granulated to a convenient (non-critical) particle size for storage or use as a dry concentrate.

To prepare a liquid concentrate of the dry composition, a suitable organic carrier liquid, as hereinafter defined, is added to an amount of the dry material to provide a suitable slurry viscosity for grinding in, e.g., a ball mill, whereupon, the slurry is ground for from about 8 to 24 hours. A suitable grinding viscosity is one when the maximum, rolling, tumbling and grinding effect is obtained. After grinding, the contents are cleaned out of the mill using carrier liquid as a wash as well as a diluent to provide a concentrate having a convenient concentration of catalyst of from about 10 to about 20 grams per liter of concentrate. Shelf life of this liquid concentrate is several months, whereas, the dry concentrate has an infinite shelf life.

To prepare a working developer bath from said liquid concentrate, additional carrier liquid is added to provide a final catalyst concentration of from about 0.005 to about 1.0 grams per liter of bath, preferably 0.1 to about 0.25 grams per liter of bath.

DETAILED DESCRIPTION OF THE INVENTION

The resin, catalyst, pigment and carrier liquid components used in the novel method of the present invention are described as follows:

(a) Cross-linking promoting material component

The cross-linking promoting material or catalyst component of the developer composition of the present invention is one which promotes or aids cross-linking of resins used in electrophotographic coatings, such as, for example, silicone or epoxy resins, or mixtures thereof, as binders in the aforesaid photoconductive coatings. Examples of catalysts include alkoxy aluminum fatty acid salts and hydroxy ether aluminum fatty acid salts.

The alkoxy catalyst salts comprise in general a group of dialkoxy aluminum fatty acid salts wherein each alkoxy group of any particular salt within said group contains from 1 to about 10 carbon atoms, inclusive, and the fatty acid radicals thereof contain from about 6 to about 18 carbon atoms, inclusive. Of these alkoxy salts, dimethoxy aluminum octanoate and diethoxy aluminum octanoate are preferred. In general, these alkoxy aluminum fatty acid salts may be prepared by reacting a primary alcohol with an aluminum fatty acid salt under alkaline conditions, said alcohol having from 1 to about 10 carbon atoms, inclusive, and the fatty acid radical of said aluminum salt having from about 6 to 18 carbon atoms, inclusive, at a temperature of from about 20° to about 250° C., and separating the solid alkoxy aluminum fatty acid salt so-formed from the liquid phase of the reaction mass.

The hydroxy ether catalyst salts comprise in general a group of said salts corresponding to the formula:

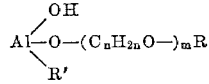

wherein R' represents a fatty acid radical containing from 6 to 12, inclusive, carbon atoms, $n$ represents an integer of from 2 to 3, inclusive, $m$ represents an integer of from 1 to 3, inclusive, and R represents an alkyl radical containing from 1 to 4 carbon atoms, inclusive. Of these hydroxy ether salts, aluminum ethoxyethyl ether octanoate and aluminum ethoxy methyl ether octanoate are preferred. In general, these hydroxy ether salts may be prepared by reacting a primary straight chained glycol ether with an aluminum fatty acid salt under alkaline conditions, the fatty acid radical of said aluminum fatty acid salt having from 6 to 12 carbon atoms, inclusive, at a temperature within the range of from about 20° C. to about 250° C. for at least 15 minutes, and then separating the solid hydroxy ether aluminum fatty acid salt formed from the liquid phase of the reaction mass.

(b) Resin component

The silicon intermediate resin component of the present developer composition is a toluene- or xylene-soluble, lower alkyl and/or phenyl substituted, cross-linkable siloxane resin. Lower alkyl groups are here limited to those containing one to four carbon atoms, inclusively. Cross-linkable siloxane resins essentially contain one or more reactive hydroxyl groups in all or most of the repeating units in the resin molecule in order to undergo cross-linking reactions through the hydroxyl function.

Suitable resins may be straight chain in structure, such as, for example, SR–82 silicone resin made by the General Electric Company or DC840 silicone resin made by the Dow Corning Corporation, or cyclic in structure, such as, for example, Z6018 silicone resin made by the Dow Corning Corporation. SR–82 silicone resin is a hydroxy-functional, xylene-soluble, methyl, phenyl siloxane resin with a numerical ratio, of total methyl and phenyl groups to silicon atoms in the molecule, of 1.36, and is supplied as a straw colored xylol solution with about 60 percent solids content. Z6018 silicone resin is a hydroxy-functional toluene and xylene-soluble low molecular weight (avg. 1600), methyl, propyl siloxane resin.

In a dilute developer bath composition for developing electrophotographic plates, the resin will normally be present in an amount of from about 0.05 to about 1.2 grams per liter of bath.

The resin component in contact with the catalyst component provides the necessary electrical conductivity characteristics to the developer composition as prepared in accordance with the present invention.

(c) Carrier liquid component

This component comprises an aliphatic or aromatic hydrocarbon liquid, including compatible mixtures thereof. Suitable carrier liquids include, for example, pure isoparaffinic hydrocarbons, fluorinated hydrocarbons, aliphatic naphtha solvents, and particular odorless mineral spirits.

Operable total amounts by volume of the hydrocarbon carrier liquid or liquids to use per gram of the total combined weight of the solid components of the developer, that is, the catalyst, resin, and pigment, in order to make a developer mix, concentrate, or developer bath, depends upon the diluteness required or desired of the catalyst material in the composition during preparation or use of the developer composition.

Suitable isoparaffinic hydrocarbon liquids which may be used as the carrier liquid component of the present developer composition include, for example, "Isopar G" (preferred, "Isopar E" and "Isopar H" (trademark of the Humble Oil & Refining Co.). These so-called "Isopars" are characterized by the following properties:

| Property | G | E | H |
|---|---|---|---|
| Kauri-butanol value | 27 | 29 | 27 |
| Flash point, TCC °F | 104 | ca. 45 | 123 |
| Vapor pressure at 100° F | 0.4 | 1.0 | 0.4 |
| Evaporation rate at 100% concentrate, seconds | 3,180 | 353 | 6,120 |
| Boiling range, °F | 318–350 | 240–286 | 350–371 |

The isoparaffinic hydrocarbons are further characterized by exceptionally high purity levels, and relatively high flash points, either alone or in combination with the other components of the present composition, and thus are very well suited for use in the present invention. Of the "Isopars" mentioned, Isopar G is preferred for use herein.

The fluorinated hydrocarbon liquid which may be used as a carrier liquid herein is a stable fluorinated hydrocarbon corresponding to the formula $CFCl_2CClF_2$ called "Freon TF" (trademark of the E. I. du Pont deNemours & Co.). Freon TF is a nonflammable liquid having a molecular weight of 187.39, a boiling point of 117.63° F., an evaporation rate of 170 seconds (based on $CCl_4$ being 100), a Kauri-Butanol value of 31, and is characterized by a very low toxicity level. This fluorinated hydrocarbon gives very excellent results when used as a carrier liquid in the present developer.

Aliphatic naphtha solvents known as "Solvesso" (trademark of the Humble Oil & Refining Co.) 140 and Solvesso 150 are also useful as a carrier liquid in the composition of the present invention. These liquids are characterized by the following properties:

| Property | 140 | 150 |
|---|---|---|
| Kauri-butanol values | 30 | 87–90 |
| Flash point °F | 147 | 150 |
| Evaporation rate in seconds at 100% concentrate | 3,480 | 6,000 |
| Boiling range, °F | 364–402 | 363–415 |

The high flash point and low toxicity properties of these aliphatic naphtha solvents provides a good carrier liquid for use in the invention.

Various odorless mineral spirits (aliphatic naphtha hydrocarbons) may also be employed as the carrier liquid of the novel developer composition of the invention. Those which are acceptable for use include odorless mineral spirits having a boiling range of from approx. 340° F. to about 415° F., a flash point of about 110° F. to about 160° F., and a kauri-butanol value of from about 21 to about 35.

A particularly preferred species of odorless mineral spirits is one characterized by a boiling point of about 133° F., a flash point of about 133° F., and a kauri-butanol value of about 25.

The amount of water in the developer liquid, regardless whether in the preparation of the mix or use thereof after dilution as a developer bath, as will hereinafter be discussed, should be as minimal as possible. In any event, the developer liquid should be substantially anhydrous. Further, it should be understood that various impurities may be present in the developer composition, such as, for example, those impurity amounts present in the commercially available materials and especially the liquids.

(d) Pigment component

With respect to the insoluble solid pigment component of the developer composition, suitable materials are those whose properties are compatible to those of the catalyst component. Pigments which may be used include, for example, black and red iron oxides, lead phthalocyanamine, ultramarine blue, and cyan peacock blue, which is preferred. These pigments during the developing sequence deposit on and are attracted to substantially the same plate areas as the catalyst. They aid in actual development of the image areas, and primarily in rendering same visible.

Generally, in ball milling ingredients in the preparation of the present developer composition, a ceramic jar of suitable capacity is employed using steel or ceramic balls or pellets as grinding media at approximately 100 revolutions per minute (r.p.m.). A suitable grinding viscosity lies within a viscosity range of from about 2500 to about 11,000 centistokes, preferably from about 5000 to 6000 centistokes.

USE OF DEVELOPER COMPOSITION

When employing the present composition as a bath to develop eelctrographic plates, the dry concentrate of the composition, as hereinbefore described, is first milled then diluted with carrier liquid, preferably an aliphatic type, to provide the proper concentration by weight of catalyst per liter of final bath and the desired level of electrical conductivity within the range specified. The bath so-formulated is then placed in a developer tank, which may be a tray or preferably a commercially available developer tank which circulates the bath. The plate to be developed is immersed in the tank. The duration of the plate in the developer is usually a matter of seconds, e.g., from about 5 to 60 seconds. From time-to-time, of course, the bath must be replenished as needed with more catalyst.

Among the advantages of the invention are that the developer composition prepared by the present method has a high capacity for processing electrophotographic plates, an accelerated and complete image development, controlled deposition of catalyst particles in image areas in a manner to prevent excess and waste of catalyst, and effective control of unwanted deposition of catalyst particles in the non-image areas. In addition, the developer concentrates and bath are time stable and do not congeal upon prolonged standing. The developer so-prepared of the present invention, moreover, is essentially non-corrosive, substantially non-hazardous, and has a low tolerable toxicity level.

EXAMPLE

The following materials were placed in a one quart ball mill jar, sealed and placed in an oven at about 70° C. for 5½ hours, then cooled to room temperature.

17.6 grams dimethoxy aluminum octanoate
6.4 grams Dow Corning Z6018 silicone resin
600.0 ml. toluene 200 grams of ⅜ inch steel balls and 20 grams of cyan peacock blue pigment were then added and the entire mixture ball milled at 100 r.p.m. for 18 to 20 hours. So-milled the contents were removed from the jar and evaporated to dryness. The dried material was granulated into a discrete particle size and placed in a sealed container for storage.

A portion of the granulated material in an amount of about 75 grams together with 600 ml. of Isopar G (or odorless mineral spirits) was placed in a one-quart ball mill jar, using 2000 grams of ⅜-inch steel balls as a grinding medium, whereupon, it was milled at 100 r.p.m. for 18 to 20 hours to reduce particle size. The resultant ground slurry was then diluted with a carrier liquid of, e.g., Isopar G to 3500 ml. (20 grams of solid per liter). Part of this material so diluted was stored in sealed containers for in excess of three months, while another portion was further diluted with carrier liquid to produce a working developer bath of a processing electrophotographic plates which had been electrostatically charged, and exposed by focus to an image desired to be reproduced. The concentration of catalyst in the bath was within the range hereinbefore stated. In addition, the conductivity of the developer bath was within a range of from about $0.5 \times 10^{-11}$ to about $10^{-9}$ reciprocal ohm centimeters.

Images developed from such a working developer bath were clear and sharp and of excellent quality, having been completely developed. Essentially there was no deposition of catalyst in the non-image areas and there appeared to be little or no excess deposition of catalyst in the image areas. On prolonged standing for even three months the bath did not congeal at all.

Among the advantages of the invention is that it provides a dry, infinitely storable and stable, developer composition, which can be easily processed by the ultimate user by further milling and dilution with carrier liquid to provide a liquid developer bath as needed, which will develop a number of electrophotographic plates in a high quality manner.

The invention may be modified and changed without departing from the spirit or scope thereof, and it is understood that the present invention is only limited as defined in the appended claims.

I claim:

1. A method for preparing a dry developer composition concentrate, which consists essentially of the combination of steps of:

heating a mixture of a silicone intermediate resin and a cross-linking promoting catalyst suspended in an aromatic organic carrier liquid at a temperature of from about 50° C. to about 100° C. for a period of from about 1 to about 24 hours, the silicone intermediate resin having reactive hydroxyl groups and being capable of cross-linking during subsequent heating at an elevated temperature in the presence of the promoting catalyst, the promoting catalyst being a material selected from the group consisting of an alkoxy aluminum fatty acid salt, a hydroxy ether aluminum fatty acid salt and mixtures of such salts, and the weight ratio of catalyst-to-resin being within the range of from about 1 to about 5;

admixing with the resin-catalyst mixture from about 0.5 to about 4 parts by weight of an insoluble solid pigment per part of the resin-catalyst solids in said mixture;

milling the resin-catalyst mixture and the pigment together in a grinding mill for at least about 8 hours at a viscosity of contents in the mill to promote maximum tumbling and grinding;

and evaporating the materials so-milled to dryness, thereby to prepare a dry developer concentrate.

2. The method of claim 1 plus the additional step of milling the dry concentrate product with an organic carrier liquid for from about 8 to about 24 hours to produce a liquid developer concentrate containing submicron sized catalyst particles.

3. The method of claim 2 plus the additional step of diluting the liquid concentrate with an organic carrier liquid to provide a liquid developer bath having a concentration of said catalyst particles therein of from about 0.005 to about 1.0 grams per liter of bath and an electrical conductivity within the range of from about $0.5 \times 10^{-11}$ to about $10^{-9}$ reciprocal ohm centimeters.

References Cited

UNITED STATES PATENTS 3,165,420   1/1965   Tomanek et al. ------ 117—17.5

GEORGE F. LESMES, Primary Examiner

J. P. BRAMMER, Assistant Examiner

U.S. Cl. X.R.

96—1; 117—17.5, 37; 260—37, 46.5